(12) United States Patent
Ito et al.

(10) Patent No.: US 12,019,434 B2
(45) Date of Patent: Jun. 25, 2024

(54) MANUFACTURING CONDITION OUTPUT APPARATUS, QUALITY MANAGEMENT SYSTEM, AND STORAGE MEDIUM

(71) Applicants: Kabushiki Kaisha Toshiba, Tokyo (JP); Toshiba Digital Solutions Corporation, Kawasaki (JP)

(72) Inventors: Toru Ito, Kawasaki (JP); Shintarou Takahashi, Kawasaki (JP); Toshiyuki Katou, Yokohama (JP); Rumi Hayakawa, Yokohama (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 85 days.

(21) Appl. No.: 17/455,460

(22) Filed: Nov. 18, 2021

(65) Prior Publication Data

US 2022/0075360 A1    Mar. 10, 2022

Related U.S. Application Data

(63) Continuation of application No. PCT/JP2020/011373, filed on Mar. 16, 2020.

(30) Foreign Application Priority Data

May 22, 2019    (JP) ................................. 2019-096286

(51) Int. Cl.
*G05B 23/02*    (2006.01)
*G06Q 10/0639*    (2023.01)

(52) U.S. Cl.
CPC ....... *G05B 23/024* (2013.01); *G05B 23/0272* (2013.01); *G06Q 10/06395* (2013.01)

(58) Field of Classification Search
CPC .............. G05B 23/024; G05B 23/0272; G05B 2219/32187; G05B 2219/32188; G06Q 10/06395
See application file for complete search history.

(56) References Cited

U.S. PATENT DOCUMENTS

| 2007/0180324 | A1* | 8/2007 | Nakamura | ........... G05B 23/024 |
| | | | | 714/37 |
| 2018/0203439 | A1 | 7/2018 | Hattori et al. | |
| 2020/0257916 | A1* | 8/2020 | Nishizawa | ............. B22D 17/10 |

FOREIGN PATENT DOCUMENTS

| CN | 109472105 A | 3/2019 |
| GB | 2496040 A | 5/2013 |
| JP | H06259047 A | 9/1994 |
| JP | 2007165721 A | 6/2007 |
| JP | 2008-181341 A | 8/2008 |

(Continued)

*Primary Examiner* — Manuel A Rivera Vargas
(74) *Attorney, Agent, or Firm* — Maier & Maier, PLLC

(57) ABSTRACT

A manufacturing condition output apparatus of an embodiment is a manufacturing condition output apparatus which outputs a manufacturing condition of a product. The manufacturing condition output apparatus outputs change degree information which is information regarding degrees of change of values regarding defect probabilities for a plurality of variables relating to manufacturing of the product from model information of a model generated through machine learning on a basis of manufacturing data of the product and inspection result data of the product, as a manufacturing condition.

8 Claims, 9 Drawing Sheets

(56) References Cited

FOREIGN PATENT DOCUMENTS

| | | | |
|---|---|---|---|
| JP | 2010-029925 | A | 2/2010 |
| JP | 4855353 | B2 | 1/2012 |
| JP | 5003362 | B2 | 8/2012 |
| JP | 5232560 | B2 | 7/2013 |
| JP | 5434837 | B2 | 3/2014 |
| JP | 201645799 | A | 4/2016 |
| JP | 2016200949 | A | 12/2016 |
| JP | 2018-180703 | A | 11/2018 |
| JP | 2019-074969 | A | 5/2019 |
| JP | 6591509 | B2 | 10/2019 |
| JP | 2020-075385 | A | 5/2020 |
| JP | 6811018 | B2 | 1/2021 |

\* cited by examiner

FIG. 2

| TIME POINT | SHOT NUMBER | CASTING TEMPERATURE A | CASTING PRESSURE B | COOLING AMOUNT C | ... | |
|---|---|---|---|---|---|---|
| MM/DD HH:MM | 1 | 200 | 4 | 0.1 | ... | |
| MM/DD HH:MM | 2 | 250 | 5 | 0.5 | ... | |
| MM/DD HH:MM | 3 | 220 | 3 | 0 | ... | |
| MM/DD HH:MM | 4 | 280 | 2 | 0.8 | ... | |
| ... | ... | ... | ... | ... | ... | |

FIG. 3

| INSPECTION RESULT | TIME POINT | SHOT NUMBER |
|---|---|---|
| DEFECTIVE PRODUCT | MM/DD HH:MM | 1 |
| GOOD-QUALITY PRODUCT | MM/DD HH:MM | 2 |
| GOOD-QUALITY PRODUCT | MM/DD HH:MM | 3 |
| DEFECTIVE PRODUCT | MM/DD HH:MM | 4 |
| . . . | . . . | . . . |

MANUFACTURING CONDITION OUTPUT APPARATUS, QUALITY MANAGEMENT SYSTEM, AND STORAGE MEDIUM

CROSS REFERENCE TO RELATED APPLICATION

This application is a continuation application of PCT/JP2020/011373 filed on Mar. 16, 2020 and claims benefit of Japanese Application No. 2019-096286 filed in Japan on May 22, 2019, the entire contents of which are incorporated herein by this reference.

BACKGROUND OF THE INVENTION

1. Field of the Invention

An embodiment of the present invention relates to a manufacturing condition output apparatus, a quality management system, and a storage medium.

2. Description of the Related Art

Quality management is performed in manufacturing of various kinds of products. To improve quality of products, methods have been proposed which include a method of controlling quality of products by calculating a target value of an optimal manufacturing condition using a linear regression formula on actual data of a manufacturing condition and changing the manufacturing condition on the basis of the target value, and a method of improving quality by automatically extracting combinations of operation factors which are effective in improvement of quality and automatically providing guidance regarding combinations of operating conditions which satisfy a predetermined quality level.

However, the method using the linear regression formula can only be applied to manufacturing conditions in which respective variables have linear relationship. Further, with the method of automatically providing guidance regarding combinations of the operating conditions, a calculation amount in accordance with the number of combinations enormously increases as the number of combinations of operation factors increases, and thus, appropriate multivariable analysis cannot be performed on operation factor data with a large number of dimensions. For example, in a case of manufacturing of a die-cast product, or the like, the manufacturing condition has non-linear relationship with respect to quality and also has a large number of operation factors. Further, these methods do not take into account how a manufacturing condition should be set for a defect probability to prevent occurrence of a defect of a product.

SUMMARY OF THE INVENTION

A manufacturing condition output apparatus of the embodiment is a manufacturing condition output apparatus which includes a processor and outputs a manufacturing condition of a product. The processor is configured to output change degree information which is information regarding degrees of change of values regarding defect probabilities for a plurality of variables relating to manufacturing of the product from model information of a model generated through machine learning on the basis of manufacturing data of the product and inspection result data of the product, as a manufacturing condition.

BRIEF DESCRIPTION OF THE DRAWINGS

FIG. 2 is a view illustrating an example of manufacturing data according to the embodiment;

FIG. 3 is a view illustrating an example of inspection result data according to the embodiment;

DETAILED DESCRIPTION OF THE PREFERRED EMBODIMENT(S)

An embodiment will be described below with reference to the drawings.

(System Configuration)

Figure 1:
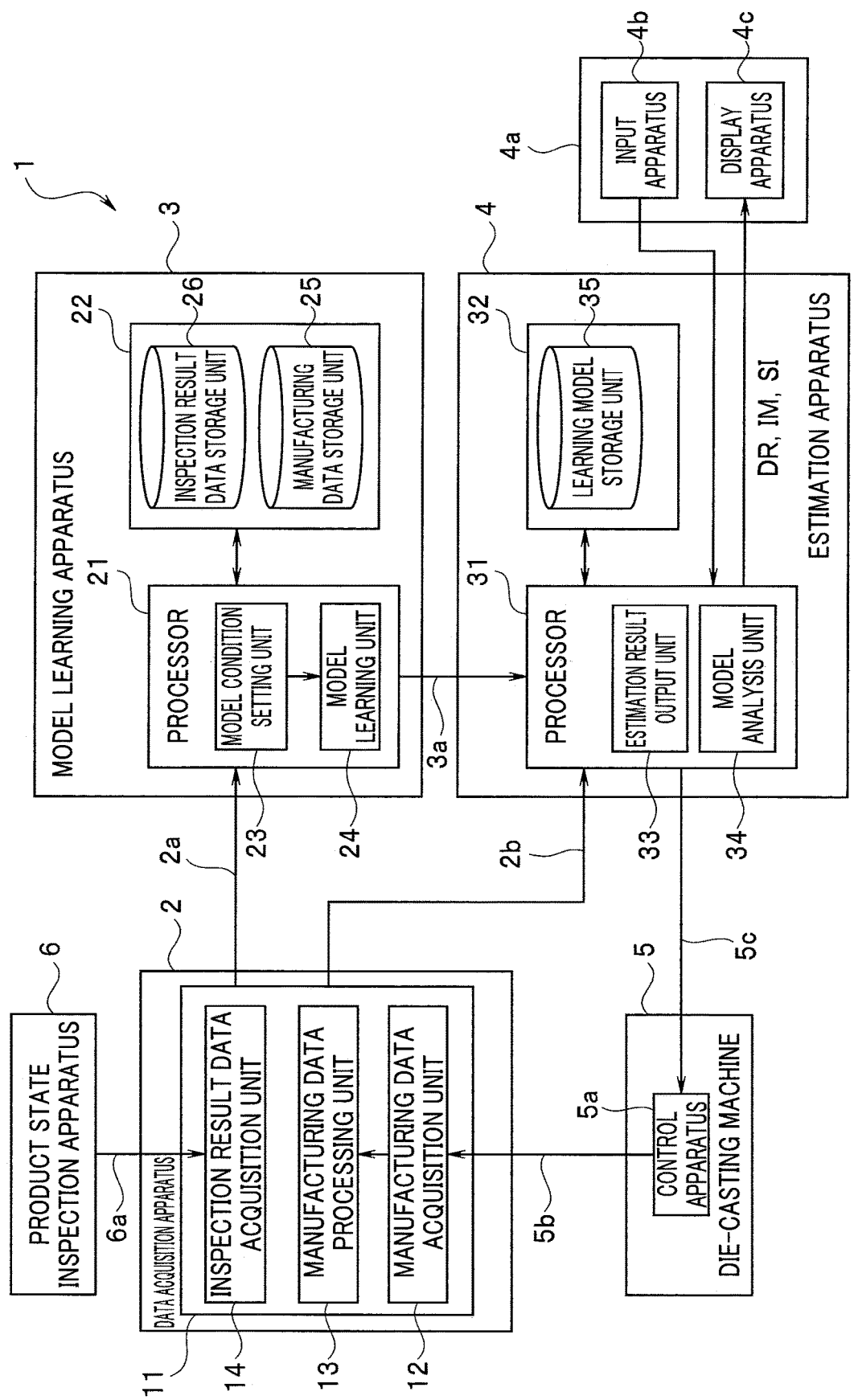
FIG. 1 is a configuration diagram of a quality management system relating to manufacturing of a cast product according to an embodiment.

FIG. 1 is a configuration diagram of a quality management system 1 relating to manufacturing of a cast product according to the present embodiment. The quality management system 1 is a cast quality management system which performs quality management of a cast product such as an aluminum die-cast product. The quality management system 1 includes a data acquisition apparatus 2, a model learning apparatus 3, and an estimation apparatus 4. The data acquisition apparatus 2 is connected to a die-casting machine 5 and a product state inspection apparatus 6. The die-casting machine 5 is a manufacturing apparatus which manufactures a die-cast product as a product. The die-casting machine 5 includes a manufacturing mechanism (not illustrated) such as a mechanism for moving a mold and a mechanism for injecting a molten metal such as aluminum to a mold cavity, and a control apparatus 5a which controls operation of the die-casting machine 5.

Note that the estimation apparatus 4 generates a setting screen for setting a manufacturing condition for a good-quality product and outputs the setting screen to a display apparatus 4c. Thus, the estimation apparatus 4 constitutes a manufacturing condition output apparatus which outputs a manufacturing condition of a product and the quality management system 1 performs quality management using the output manufacturing condition. In other words, the manufacturing condition output apparatus is part of the quality management system 1.

Note that the data acquisition apparatus 2, the model learning apparatus 3 and the estimation apparatus 4 may be connected to one another with a signal line which will be described later to transmit and receive data, and may be disposed, for example, in one factory in which the die-casting machine 5 is provided. Alternatively, the model learning apparatus 3 and the estimation apparatus 4 may be servers on cloud via a network such as the Internet.

(Configuration of Data Acquisition Apparatus)

The data acquisition apparatus 2, which is an apparatus including a processor 11, is, for example, a personal computer (hereinafter, referred to as a "PC") including an input/output interface with the die-casting machine 5 and the product state inspection apparatus 6. The processor 11 includes a manufacturing data acquisition unit 12, a manufacturing data processing unit 13, and an inspection result data acquisition unit 14.

The processor 11 includes a central processing unit (hereinafter, referred to as a "CPU"), a ROM, and a RAM. The processor 11 also includes a non-volatile memory such as a hard disk apparatus. The data acquisition apparatus 2 can receive various kinds of data from the die-casting machine 5 and the product state inspection apparatus 6 and transmit various kinds of data to the model learning apparatus 3 and the estimation apparatus 4 by the CPU reading out and executing various kinds of software programs stored in the ROM and the non-volatile memory.

Here, the manufacturing data acquisition unit 12, the manufacturing data processing unit 13, and the inspection result data acquisition unit 14 are constituted with software programs. Note that all or part of the manufacturing data acquisition unit 12 and the inspection result data acquisition unit 14 may be constituted with electronic circuits.

The manufacturing data acquisition unit 12 acquires manufacturing data from the control apparatus 5a of the die-casting machine 5 via a communication line 5b. The manufacturing data is, for example, time point data, manufacturing shot number and various kinds of measurement data for each shot of die-cast product.

Various kinds of sensors for various kinds of measurement data, such as a temperature sensor, a position sensor and a pressure sensor are attached to the die-casting machine 5 or incorporated into the die-casting machine 5. The manufacturing shot number is shot identification information for identifying a manufacturing shot. The control apparatus 5a includes a clock and generates time point data. The time point data includes date and time. The control apparatus 5a of the die-casting machine 5 collects various kinds of measurement data for each shot of die-cast product and stores the manufacturing shot number and the time point data in a memory (not illustrated) such as a buffer.

The manufacturing data acquisition unit 12 includes various kinds of interface circuits for acquiring manufacturing data temporarily stored in the memory of the die-casting machine 5, and a software program for performing processing of temporarily storing the acquired manufacturing data in a memory (not illustrated).

The manufacturing data processing unit 13 performs adjustment of the number of digits of data, supplement of deficiency of data, or the like, on the manufacturing data stored in the manufacturing data acquisition unit 12 so that the model learning apparatus 3 which will be described later can appropriately execute model learning processing.

Various kinds of processing are performed on a die-cast product manufactured at the die-casting machine 5, for example, an aluminum die-cast product in subsequent process.

A die-cast product inspection is performed for the die-cast product which is manufactured at the die-casting machine 5 or the die-cast product which is processed in subsequent process. Inspection result data is data indicating whether the die-cast product is a good-quality product or a defective product. Note that the inspection result data may include data including a type of a defect of the defective product. The type of a defect includes a misrun, a blowhole, and the like. Further, the inspection result data may be a numerical value indicating quality. In this case, the inspection result data is, for example, a numerical value indicating a degree of dent on a surface, and the inspection result data may be indicated in a range of the numerical value.

The product state inspection apparatus 6, which is, for example, an inspection apparatus of a die-cast product, inspects the die-cast product using an apparatus such as a camera and determines whether the die-cast product is a good-quality product or a defective product on the basis of an inspection result. The product state inspection apparatus 6 generates and outputs the inspection result data indicating whether the die-cast product is a good-quality product or a defective product for each shot number of the inspected cast product on the basis of a determination result. The inspection result data acquisition unit 14 acquires the inspection result data from the product state inspection apparatus 6 via a communication line 6a. In other words, the inspection result data acquisition unit 14 acquires the inspection result data of the die-cast product manufactured by the die-casting machine 5.

Note that an inspector may perform inspection, and the product state inspection apparatus 6 may be an apparatus, for example, a PC to which a result of determination performed by the inspector, that is, a determination result indicating whether the die-cast product is a good-quality product or a defective product is input.

FIG. 2 is a view illustrating an example of the manufacturing data. The manufacturing data includes various kinds of data such as a time point, a shot number, a casting temperature A, a casting pressure B and a cooling amount C. One shot corresponds to manufacturing of one die-cast product, and one piece of manufacturing data is one piece of record data regarding one shot. A plurality of pieces of manufacturing data are acquired at the manufacturing data acquisition unit 12. As will be described later, a plurality of pieces of manufacturing data are contained in a manufacturing data storage unit 25 as data in a tabular form as illustrated in FIG. 2.

FIG. 3 is a view illustrating an example of the inspection result data. The inspection result data includes data of an inspection result, time point data and a shot number. The time point data is the same as the time point data in the manufacturing data specified with the shot number. As will be described later, a plurality of pieces of inspection result data are contained in an inspection result data storage unit 26 as data in a tabular form as illustrated in FIG. 3. One piece of inspection result data can be associated with one piece of manufacturing data by the shot number.

(Configuration of Model Learning Apparatus)

The model learning apparatus 3 includes a processor 21 and a storage apparatus 22. The model learning apparatus 3, which is, for example, a PC, may be a server on the Internet as described above. The processor 21 is connected to the data acquisition apparatus 2 via a communication line 2a. The processor 21 includes a CPU, a ROM, a RANI and a hard disk apparatus. The model learning apparatus 3 performs machine learning on the basis of the manufacturing data and the inspection result data from the data acquisition apparatus 2 and creates a model M which is an identification model for whether the die-cast product is good or defective.

The processor 21 acquires the manufacturing data and the inspection result data from the data acquisition apparatus 2 via the communication line 2a using a command by a user or with a predetermined period. The processor 21 stores the acquired manufacturing data in the manufacturing data storage unit 25 of the storage apparatus 22. The processor 21 stores the acquired inspection result data in the inspection result data storage unit 26 of the storage apparatus 22. The manufacturing data storage unit 25 is a predetermined recording area in the storage apparatus 22 for storing the manufacturing data. The inspection result data storage unit 26 is a predetermined recording area in the storage apparatus 22 for storing the inspection result data.

The processor 31 includes a model condition setting unit 23 and a model learning unit 24. The model condition setting unit 23 is a software program which sets parameter data of various kinds of conditions of when machine learning is performed and provides the set parameter data to the model learning unit 24.

The model learning apparatus 3 includes an input apparatus such as a keyboard and a mouse which are not illustrated, a display apparatus, and the like, which is not illustrated. Thus, the user can set parameter data of various kinds of conditions to be set at the model condition setting unit 23 using the input apparatus and the display apparatus. The parameter data is, for example, the number of pieces of training data to be used when the model is generated, the number of decision trees to be generated, or the like.

The model learning unit 24 is a software program which generates a model M through machine learning using the manufacturing data and the inspection result data stored in the storage apparatus 22 as training data. In other words, the model learning unit 24 generates a model which estimates whether the die-cast product manufactured at the die-casting machine 5 is a good-quality product or a defective product through machine learning on the basis of the manufacturing data and the inspection result data. The manufacturing data can be associated with the inspection result data by the shot number, so that the processor 31 can provide a plurality of pieces of training data in which the manufacturing data is respectively associated with the inspection result data, to the model learning unit 24.

Here, the model M is a non-linear model generated using a machine learning algorithm of random forest. The model M is a defect identification model which estimates and outputs a probability that a defect occurs, that is, a defect probability of a die-cast product manufactured in accordance with manufacturing data in a case where the manufacturing data is provided. The random forest is a collective learning algorithm which creates a plurality of decision trees from randomly selected variables (manufacturing data) and performing ensemble learning by performing processing of averaging, or the like, the plurality of decision trees using respective decision trees as weak classifiers. A classification boundary with high accuracy is created by classification boundaries of the respective created decision trees being added. In other words, the non-linear model M is a model learned through ensemble learning such as random forest using a plurality of decision trees. Thus, a robust classification boundary is generated from a plurality of decision trees which are weak classifiers by the decision trees being ultimately integrated through ensemble learning.

Note that while the model learning unit 24 uses the machine learning algorithm of the random forest as a collective learning algorithm which performs ensemble learning to generate the model M here, the model learning unit 24 may use machine learning algorithm such as bagging method, boosting method, adaptive boosting method, gradient boosting method, extreme gradient boosting method, extreme randomized tree method and regularized random forest method.

Figure 4:
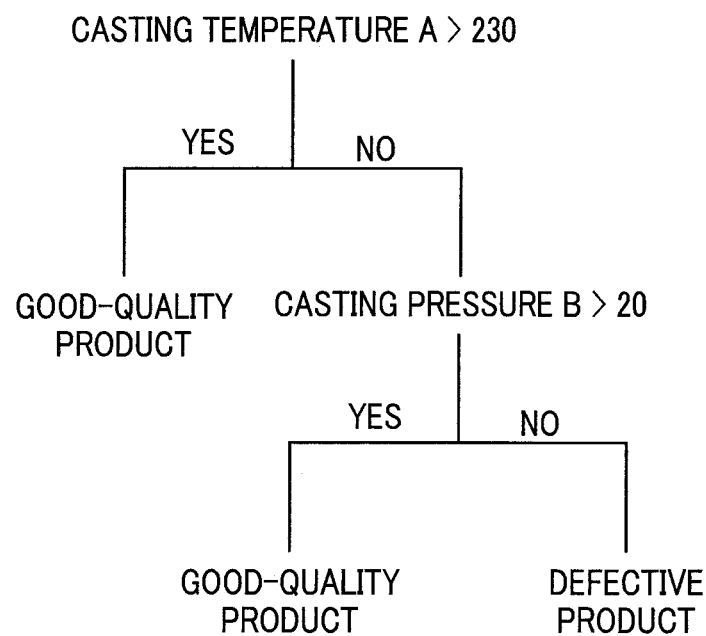
FIG. 4 is a view for explaining an example of a decision tree according to the embodiment.

Here, the model M means collection of a plurality of decision trees generated also using learning data (training data) as illustrated in FIG. 4. FIG. 4 is a view for explaining an example of a decision tree. In FIG. 4, in a case where the casting temperature A exceeds 230° C., it is determined that the die-cast product is a good-quality product. Further, in a case where the casting temperature A is equal to or lower than 230° C., and the casting pressure B exceeds 20, it is determined that the die-cast product is a good-quality product. Still further, in a case where the casting temperature A is equal to or lower than 230° C., and the casting pressure B is equal to or less than 20, it is determined that the die-cast product is a defective product.

Model data of the model M generated at the model learning unit 24, that is, model information MI is contained in the memory of the processor 21 and transmitted to the estimation apparatus 4. In the model information MI, the decision tree is expressed as data in a list form.

(Configuration of Estimation Apparatus)

The estimation apparatus 4 includes a processor 31 and a storage apparatus 32. The processor 31 is connected to a man-machine interface (hereinafter, referred to as an "MMI") 4a. The MMI 4a includes an input apparatus 4b and a display apparatus 4c. The input apparatus 4b includes a keyboard, a mouse, and the like. The estimation apparatus 4 acquires the manufacturing data from the data acquisition apparatus 2 and displays an estimation result of good or defective at the display apparatus 4c on the basis of the manufacturing data. Further, the estimation apparatus 4 analyzes the model information MI of the model M received from the model learning apparatus 3, outputs information regarding decrease in a defect probability and displays the information at the display apparatus 4c.

The processor 31 is connected to the data acquisition apparatus 2 via a communication line 2b. Further, the processor 31 is connected to the control apparatus 5a of the die-casting machine 5 via a communication line 5c. The processor 31 is connected to the model learning apparatus 3 via a communication line 3a. The processor 21 includes a CPU, a ROM, a RAM and a hard disk apparatus.

The processor 31 includes an estimation result output unit 33 and a model analysis unit 34. The storage apparatus 32 includes a learning model storage unit 35. The processor 31 receives the model information MI of the model M from the model learning apparatus 3 and stores the model information MI in the learning model storage unit 35. The learning model storage unit 35 is a storage area which contains the received model information MI of the model M.

Figure 5:
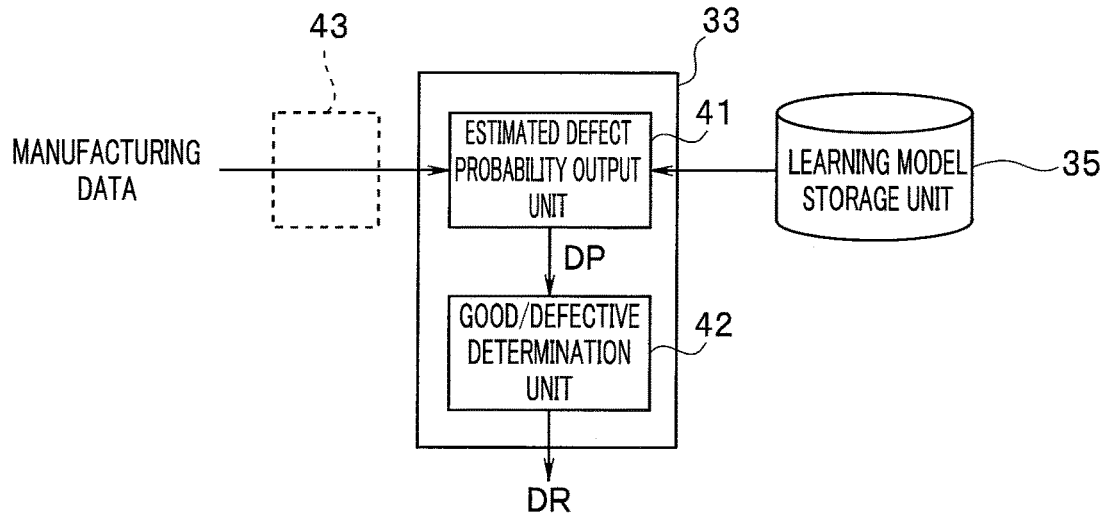
FIG. 5 is a functional block diagram of an estimation result output unit according to the embodiment.

The estimation result output unit 33 is a software program which outputs an estimation result of good or defective on the basis of the manufacturing data. FIG. 5 is a functional block diagram of the estimation result output unit 33. The estimation result output unit 33 includes an estimated defect probability output unit 41 and a good/defective determination unit 42. The estimated defect probability output unit 41 calculates a defect probability on the basis of the received manufacturing data using the model information MI of the model M contained in the learning model storage unit 35 and outputs defect probability data DP to the good/defective determination unit 42. The good/defective determination unit 42 outputs an estimation result DR as to whether the die-cast product manufactured in a shot regarding the received manufacturing data on the basis of the received defect probability data DP is good or defective. Thus, the estimation result output unit 33 estimates whether the die-cast product is a good-quality product or a defective product on the basis of the manufacturing data acquired at the data acquisition apparatus 2 using the model M and outputs the estimation result.

When the manufacturing data regarding the die-cast product manufactured at the die-casting machine 5 is transmitted from the data acquisition apparatus 2 to the estimation result output unit 33 in real time, the estimation result output unit 33 estimates whether the die-cast product is good or defective on the basis of the manufacturing data using the model information MI of the model M and outputs the estimation result DR. In other words, the estimation result output unit 33 can estimate whether the die-cast product manufactured at the die-casting machine 5 is good or defective using the model M on the basis of the manufacturing data acquired in real time.

Note that whether die-cast products are good or defective may be collectively estimated for a plurality of pieces of manufacturing data through batch processing. In this case, as indicated with a dotted line in FIG. 5, a manufacturing data containment unit 43 which accumulates the manufacturing data from the manufacturing data processing unit 13 is provided at the estimation apparatus 4. The manufacturing data containment unit 43 is a storage apparatus which can contain manufacturing data corresponding to a predetermined period, for example, one day or one week. The estimated defect probability output unit 41 calculates a defect probability using the model M on the basis of a plurality of pieces of manufacturing data contained in the manufacturing data containment unit 43. The good/defective determination unit 42 determines whether each shot is good or defective on the basis of each piece of defect probability data DP and outputs the estimation result DR.

The defect probability data DP is defect probability data for each shot. The good/defective determination unit 42 has a predetermined threshold, and, for example, if the threshold is 50, determines that the die-cast product in the shot is a defective product in a case where the defect probability is equal to or higher than 50% and determines that the die-cast product in the shot is a good-quality product in a case where the defect probability is lower than 50%. In other words, the good/defective determination unit 42 determines whether the die-cast product is good or defective on the basis of the defect probability data.

Further, in a case where the defect probability data is output in accordance with a plurality of types of defects, the good/defective determination unit 42 determines whether the die-cast product in the shot is a good-quality product or a defective product in accordance with a predetermined determination rule.

In addition, the estimation result output unit 33 may include an estimated good probability output unit configured to output a probability that the die-cast product may be estimated as good in place of the estimated defect probability output unit 41, and the good/defective determination unit 42 may determine that the die-cast product in the shot is a defective product in a case where a good probability becomes lower than 50%, for example.

Figure 6:
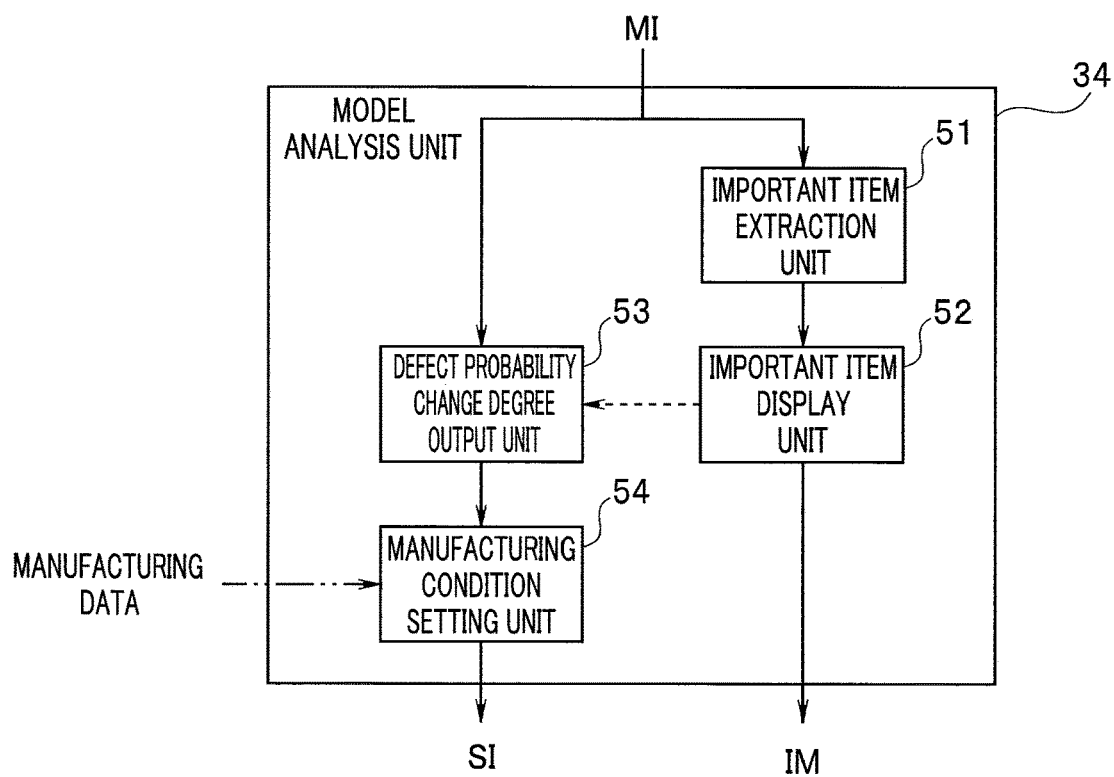
FIG. 6 is a block diagram of a model analysis unit according to the embodiment.

FIG. 6 is a block diagram of the model analysis unit 34. The model analysis unit 34 is a software program including an important item extraction unit 51, an important item display unit 52, a defect probability change degree output unit 53, and a manufacturing condition setting unit 54.

The important item extraction unit 51 calculates degrees of importance of respective variables in the model M and extracts important items from the calculated degrees of importance of the respective variables. In other words, the important item extraction unit 51 extracts variable names of a plurality of variables as important items in accordance with the degrees of importance calculated from the model information MI.

In the random forest, the degree of importance of each variable is calculated from a variable used in each decision tree and estimation accuracy of the decision tree. In other words, the calculated degree of importance indicates a magnitude of impact on the estimation accuracy among the variables regarding respective decision trees. Thus, the important item extraction unit 51 calculates degrees of importance regarding a plurality of variables such as a casting temperature, a casting pressure and a cooling amount in the manufacturing data. The degree of importance is, for example, a degree of change of a Gini coefficient and MSE (mean squared error) effectiveness in the random forest. In other words, the degree of importance indicates to what degree the Gini coefficient and the MSE effectiveness changed in data which has not been used.

Here, the important item extraction unit 51 outputs a plurality of variable names with degrees of importance higher than a set value among information regarding the degrees of importance calculated for a plurality of variables as important items. Alternatively, the important item extraction unit 51 may output information regarding variable names of a predetermined number in descending order of the degree of importance among the information regarding the degrees of importance calculated for a plurality of variables.

The important item display unit 52 generates display data IM for displaying the important items extracted at the important item extraction unit 51 at the display apparatus 4c. As described above, the important item extraction unit 51 outputs information regarding variable names with high degrees of importance to the important item display unit 52. The important item display unit 52 generates display data IM for displaying variable names with high degrees of importance from the received information regarding the variable names and outputs the display data IM to the display apparatus 4c. Thus, the important item display unit 52 constitutes an important item output unit which outputs information regarding important items extracted by the important item extraction unit 51.

Figure 7:
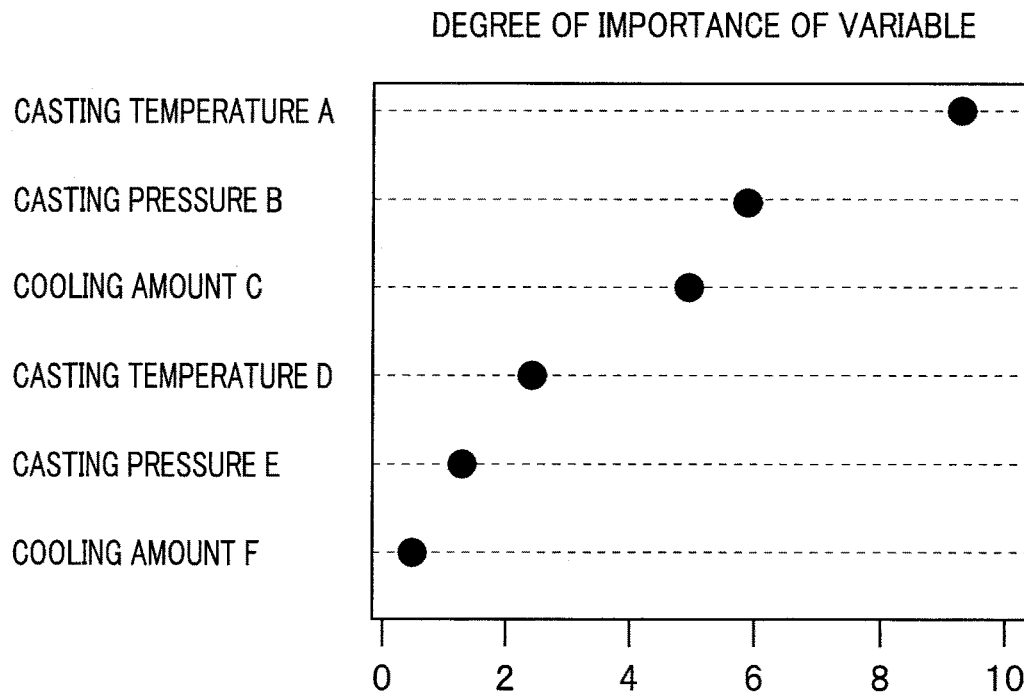
FIG. 7 is a view illustrating a display example of display data generated at an important item display unit according to the embodiment.

FIG. 7 is a view illustrating a display example of the display data generated at the important item display unit 52. FIG. 7 indicates degrees of importance of six variables. A vertical axis indicates variable names and a horizontal axis indicates values of degrees of importance. The degree of importance is a value subjected to predetermined standardization, such as the Gini coefficient. As illustrated in FIG. 7, the degree of importance of a casting temperature A is the highest, and the degrees of importance of a casting pressure B, a cooling amount C, a casting temperature D, a casting pressure E and a cooling amount F are higher in this order. The degrees of importance are indicated by dots corresponding to each variable.

The variable names and the degrees of importance of the important items as illustrated in FIG. 7 are displayed at the display apparatus 4c, so that the user can recognize variables which are important for the defect probability.

The defect probability change degree output unit 53 calculates and outputs a degree of change of the defect probability for each variable from the model information MI of the model M. The defect probability change degree output unit 53 outputs function data of the degree of change of the defect probability regarding each variable.

Figure 8:
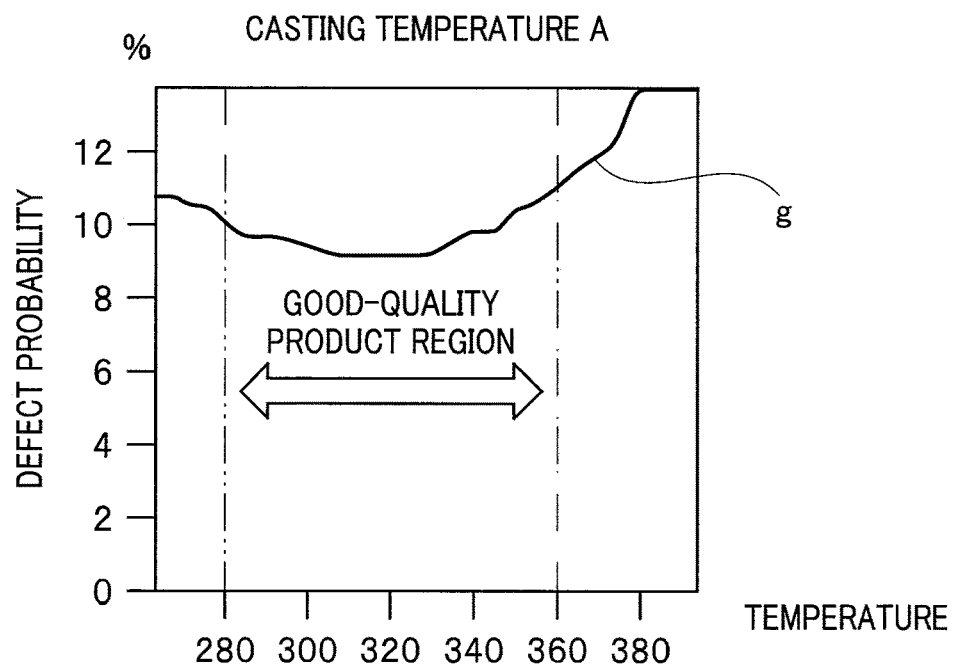
FIG. 8 is a view indicating a graph which displays a degree of change of a defective probability in accordance with a value of a variable according to the embodiment.

FIG. 8 is a view illustrating a graph displaying the degree of change of a defective probability in accordance with values of the variable. The graph in FIG. 8 is a graph for each variable, and FIG. 8 is a graph displaying a degree of change of the defective probability for the casting temperature A. In FIG. 8, a function of a graph g can be obtained from a partial dependence plot of the random forest. Each value in the graph g corresponds to a value of the partial dependence plot. In other words, the degree of change of the defect probability for each variable is calculated from the model information MI of the model M. Here, the degree of change of the defect probability for each variable is calculated using the partial dependence plot of the random forest.

Note that while the defect probability change degree output unit 53 outputs the function data of the degree of change of the defect probability for each variable here, the change degree information of the defect probability only has to include a value regarding a defect probability corresponding to the value of each variable and may be discrete data.

As will be described later, as a result of the graph g in FIG. 8 being presented to the user, the user can know from viewing the graph g in FIG. 8 that the defect probability largely changes when the casting temperature A exceeds 36° C. and when the casting temperature A becomes lower than 28° C. In other words, a temperature range indicated with a white arrow between dashed-two dotted lines is a good-quality product region where the defect probability is low. The user can therefore quantitatively determine that the defect probability can be lowered, for example, by setting the casting temperature A so as to fall within a range from 28° C. to 36° C.

Thus, the defect probability change degree output unit 53 constitutes a change degree information output unit which outputs change degree information which is information regarding degrees of change of values regarding the defect probabilities for a plurality of variables relating to manufacturing of the product from the model information of the model generated through machine learning, as a good-quality product condition, that is, a manufacturing condition. The manufacturing condition is values or ranges of the variables where the die-cast product becomes a good-quality product or a defective product in accordance with the defect probabilities.

The manufacturing condition setting unit 54 generates display data SI of a setting screen for setting the manufacturing condition for a good-quality product using the function data of the degrees of change of the defect probabilities from the defect probability change degree output unit 53. The display data includes the graph g in FIG. 8. The user can set the manufacturing condition for a good-quality product for each variable using the setting screen.

As will be described later, the estimation apparatus 4 displays the graph as illustrated in FIG. 8 at the display apparatus 4c, so that the user can set a good-quality product region on a screen displayed at the display apparatus 4c using the input apparatus 4b. Thus, the manufacturing condition setting unit 54 outputs the display data for setting the manufacturing condition such as a casting temperature in association with a probability that the die-cast product may become a good-quality product or a defective product.

Note that as indicated with a dotted line in FIG. 6, the defect probability change degree output unit 53 may obtain information regarding variable names with high degrees of importance from the important item display unit 52 and may calculate and output the degree of change of the defect probability for each variable only for variables of a predetermined number with higher degrees of importance. The number of variables for which degrees of change of the defect probability are calculated at the defect probability change degree output unit 53 decreases, so that it is possible to reduce load of the processor 31.

(Action)

Operation of the quality management system 1 will be described next. Here, processing of the model learning unit 24, the estimation result output unit 33, and the model analysis unit 34 will be described.

Figure 9:
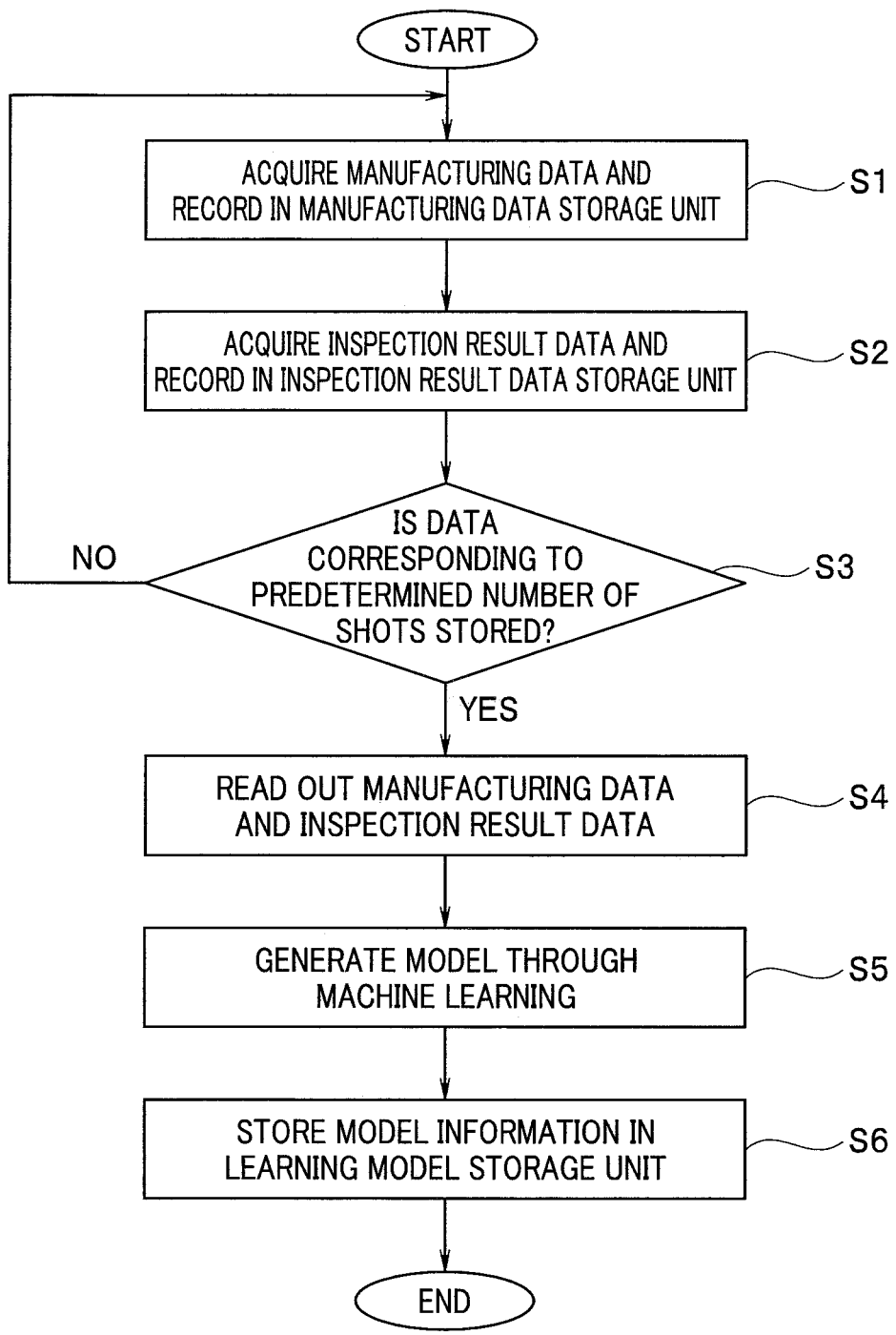
FIG. 9 is a flowchart illustrating an example of flow of processing of a model learning unit according to the embodiment.

FIG. 9 is a flowchart illustrating an example of flow of processing of the model learning unit 24. As described above, the model learning unit 24 is a software program, and thus, the processor 21 performs machine learning of the model by the CPU of the processor 21 reading out the program of the model learning unit 24 from a ROM, or the like, and executing the program.

The processor 21 acquires manufacturing data from the data acquisition apparatus 2 and records the manufacturing data in the manufacturing data storage unit 25 of the storage apparatus 22 (step (hereinafter, abbreviated as S) 1). The processor 21 acquires inspection result data from the data acquisition apparatus 2 and records the inspection result data in the inspection result data storage unit 26 of the storage apparatus 22 (S2). The processor 21 determines whether data corresponding to a predetermined number of shots (the manufacturing data and the inspection result data corresponding to the manufacturing data) is stored in the storage apparatus 22 with reference to the data stored in the manufacturing data storage unit 25 and the inspection result data storage unit 26 (S3).

In a case where the data corresponding to the predetermined number of shots is not stored in the storage apparatus 22 (S3: No), the processing returns to S1. In a case where the data corresponding to the predetermined number of shots is stored in the storage apparatus 22 (S3: Yes), the processor 21 reads out the data (the manufacturing data and the inspection result data corresponding to the manufacturing data) recorded in the storage apparatus 22 (S4).

The processor 21 generates the model M through machine learning using the readout data (the manufacturing data and the inspection result data corresponding to the manufacturing data) as training data (S5). Here, the machine learning is ensemble learning using the random forest. The random forest is an algorithm for ensemble-learning results of a plurality of decision trees using the plurality of decision trees as weak classifiers, and the model M (that is, a final classifier) learned through the random forest is generated through S5. The processor 21 transmits model information MI of the generated model M to the estimation apparatus 4 and stores the model information MI in the learning model storage unit 35 (S6).

The user can generate the model M in accordance with a desired data amount by setting a data amount required for generating the model M as a predetermined number of shots.

Figure 10:
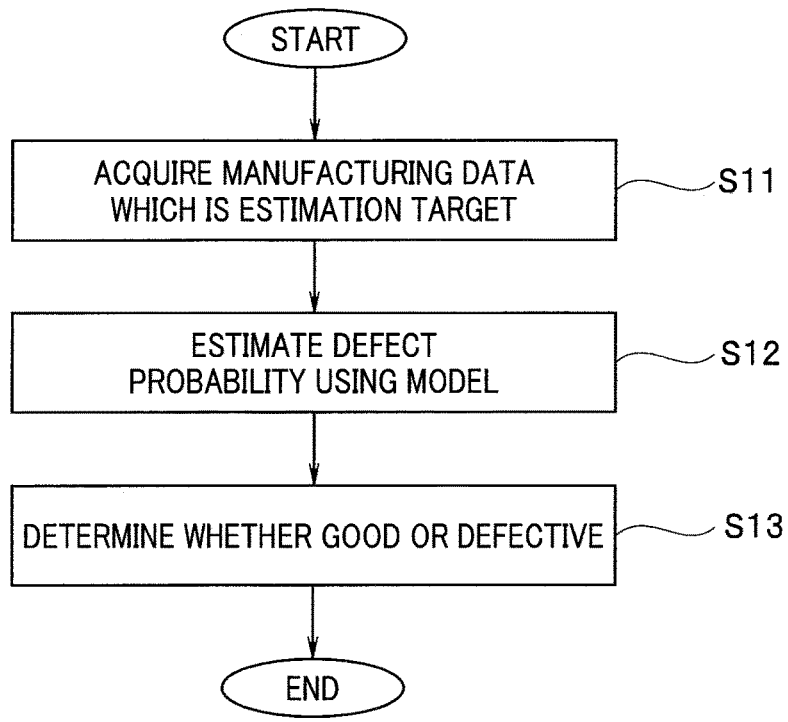
FIG. 10 is a flowchart illustrating an example of flow of processing of the estimation result output unit according to the embodiment.

FIG. 10 is a flowchart illustrating an example of flow of processing of the estimation result output unit 33. As described above, the estimation result output unit 33 is a software program, and thus, the processor 31 outputs an estimation result DR by the CPU of the processor 31 reading out a program for estimating good or defective from a ROM, or the like, and executing the program. Before the processing in FIG. 10, the processor 31 reads out the model information MI from the learning model storage unit 35.

The processor 31 acquires the manufacturing data which is an estimation target from the data acquisition apparatus 2

(S11). For example, in a case where the data acquisition apparatus 2 acquires the manufacturing data of the die-casting machine 5 in real time, the processor 31 acquires the real-time manufacturing data.

The processor 31 estimates, that is, calculates a defect probability of the die-cast product manufactured in accordance with the manufacturing data acquired in S11 using the model information MI of the model M stored in the learning model storage unit 35 (S12). The processing in S12 is performed by the estimated defect probability output unit 41.

The processor 31 determines whether the die-cast product relating to the manufacturing data is good or defective on the basis of the defect probability (S13). The processing in S13 is performed by the good/defective determination unit 42. The estimation result DR is output to the display apparatus 4c, and the determination result of good or defective is displayed at the display apparatus 4c.

Figure 11:
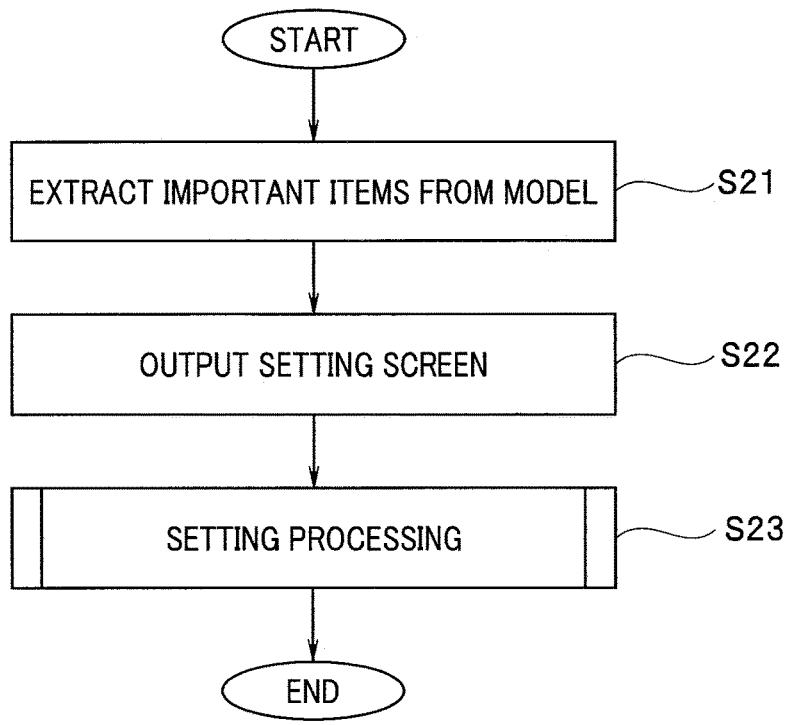
FIG. 11 is a flowchart illustrating an example of flow of processing of the model analysis unit according to the embodiment.

FIG. 11 is a flowchart illustrating an example of flow of processing of the model analysis unit 34. As described above, the model analysis unit 34 is a software program, and thus, the processor 31 performs model analysis by the CPU of the processor 31 reading out the software program from a ROM, or the like, and executing the software program. Before the processing in FIG. 11, the processor 31 also reads out the model information MI from the learning model storage unit 35.

The processor 31 extracts important items from the model information (S21). In the processing in S21, as described above, the processor 31 estimates and extracts variable names as important items on the basis of a degree of impact on the estimation accuracy of good or defective. The processing in S21 is performed by the important item extraction unit 51.

The processor 31 generates a setting screen for setting a manufacturing condition for a good-quality product and outputs the setting screen to the display apparatus 4c (S22). The processing in S22 is performed by the manufacturing condition setting unit 54. Thus, the estimation apparatus 4 constitutes the manufacturing condition output apparatus which outputs the manufacturing condition of the product.

The processor 31 executes setting processing of setting the manufacturing condition of variables on the basis of input performed on the setting screen (S23).

Figure 12:
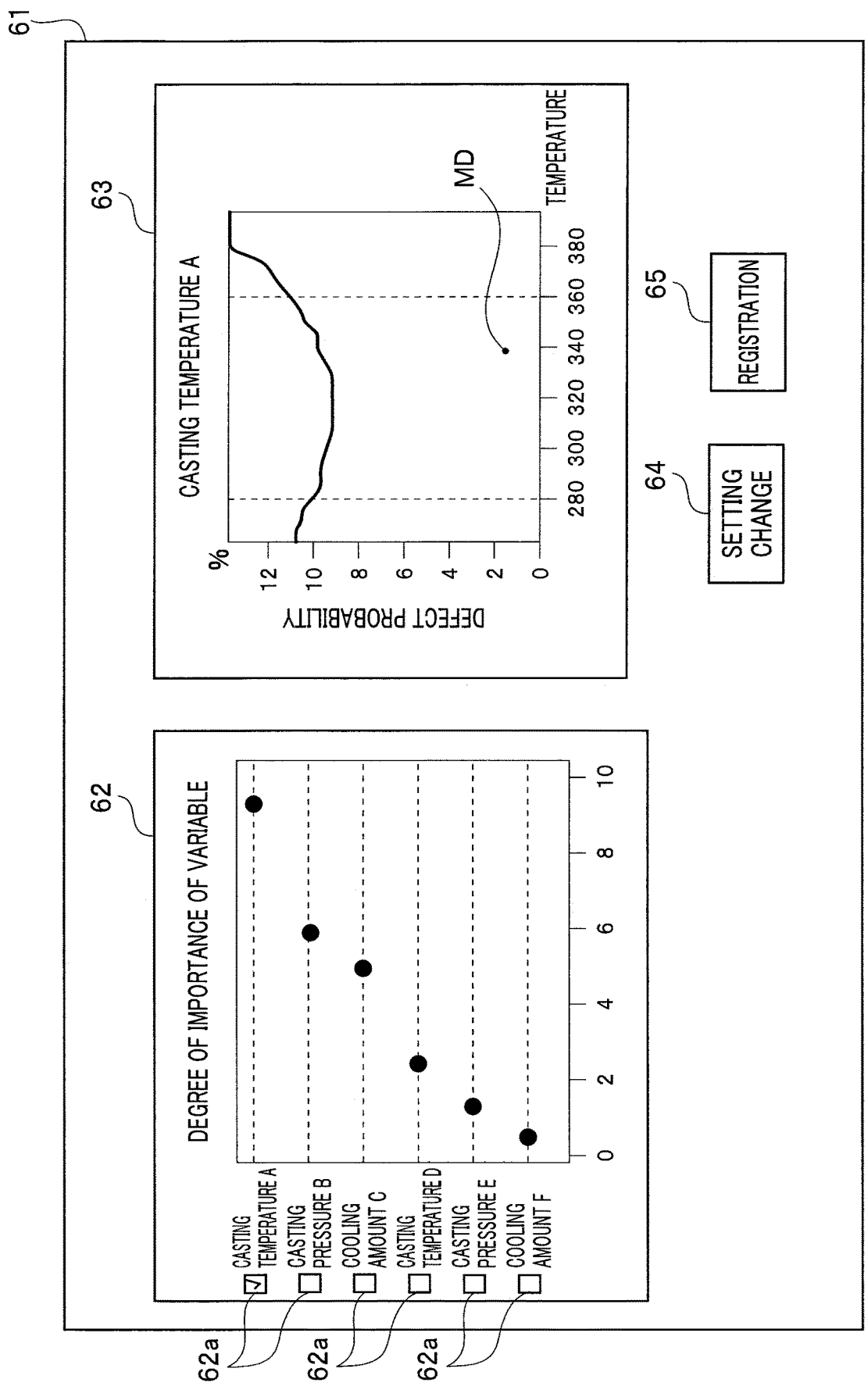
FIG. 12 is a view illustrating a display example of a setting screen according to the embodiment.

FIG. 12 is a view illustrating a display example of the setting screen generated in S22. Two windows 62 and 63 are displayed on the display screen 61 of the display apparatus 4c. The window 62 displays the display data which is generated at the important item display unit 52 and which is illustrated in FIG. 7. The window 63 displays the display data which is generated at the manufacturing condition setting unit 54 and which is illustrated in FIG. 8.

Checkboxes 62a are displayed on a left side of the respective variable names in the window 62. The user can check each checkbox 62a using a mouse, or the like, of the input apparatus 4b. In FIG. 12, the checkbox 62a corresponding to the variable name of the "casting temperature A" is checked. Thus, a setting screen corresponding to the checked variable name is displayed in the window 63.

Thus, the user can select a desired variable by utilizing the checkbox 62a and can change a setting of the manufacturing condition for the variable by clicking, for example, a "setting change" button 64 using the input apparatus 4b. In FIG. 12, two dotted lines indicate a lower limit value and an upper limit value of the casting temperature. For example, the user moves positions of the dotted lines which define the good-quality product region so that one dotted line is moved at a position of 28° C. and the other dotted line is moved at a position of 36° C. by operating a mouse, or the like, when the user desires to change the setting of the manufacturing condition.

Thereafter, the user can register and change the manufacturing condition as set in the window 63 by operating the input apparatus 4b to click, for example, a "registration" button 65. For example, the user can set a temperature range of the casting temperature A having an upper limit of 36° C. and a lower limit of 28° C. so that the defect probability of the manufactured die-cast product becomes equal to or lower than 10% for the casting temperature A in FIG. 12.

The setting information is transmitted from the processor 31 to the control apparatus 5a of the die-casting machine 5 via a communication line 5c. The received setting information is contained in the memory of the control apparatus 5a and used for controlling operation of the die-casting machine 5. In the above-described example, the control apparatus 5a controls the casting temperature A on the basis of the received setting information. As a result, equipment such as a valve relating to control of the casting temperature A of the die-casting machine 5 is controlled so that the casting temperature A upon manufacturing falls within a range from 28° C. to 36° C. with two dotted lines, so that the defect probability is reduced.

As described above, the defect probability change degree output unit 53 calculates degrees of change of the defect probabilities of a plurality of variables from the model information MI of the model M, so that the user can also set the manufacturing condition for other desired variables in a similar manner.

In other words, a degree of change of the defect probability of each variable is presented to the user, so that the user can set a condition of each variable so that the die-cast product becomes a good-quality product by viewing the degree of change of the defect probability of each variable.

Note that while in the above-described example, the user sets the setting of the good-quality product region using the MIMI 4a, a threshold of the defect probability may be set in advance in the memory of the processor 31, and the good-quality product region for each variable may be automatically set on the basis of the threshold.

Further, while in the above-described example, the setting information is transmitted to the control apparatus 5a via the communication line 5c and the setting information is automatically set, the manufacturing condition setting unit 54 may only present the degree of change of the defect probability of each variable to the user by displaying the degree of change at the display apparatus 4c. The user can manually make settings at the control apparatus 5a on the basis of the presented setting information.

In addition, in a case where the setting information is a variable which cannot be directly set at the control apparatus 5a, the user sets one or more variables relating to the setting information at the control apparatus 5a so as to match the setting information.

Further, as indicated with a dashed-two dotted line in FIG. 6, the manufacturing data may be supplied to the manufacturing condition setting unit 54 in real time, and an actual measurement value of a desired variable (here, the casting temperature A) in the manufacturing data may be superimposed on the screen. FIG. 12 indicates the actual measurement value of the casting temperature A with a dot MID. The user can therefore predict whether the die-cast product manufactured now at the die-casting machine 5 is a good-quality product or a defective product by confirming a control state of the casting temperature A in real time from the superimposed actual measurement value.

As described above, according to the above-described embodiment, the user can recognize the manufacturing condition such as which prevents occurrence of a defect for a variable which is largely involved with occurrence of a defect of the die-cast product by the model analysis unit 34. Then, the user can set a manufacturing condition of a desired variable so as to prevent occurrence of a defect, so that it is possible to prevent occurrence of a defect of the die-cast product.

Particularly, according to the above-described embodiment, a non-linear machine learning model is used, so that it is possible to perform estimation of good or defective for manufacturing data with a large number of dimensions. Further, an important item regarding whether good or defective is also extracted, so that the user can easily set the manufacturing condition for reliably reducing the defect probability.

Note that while the product for which quality is to be managed in the above-described embodiment is a die-cast product, a defect of the die-cast product such as a blowhole inside is often found in a post-process after the die-cast product taken out from the die-casting machine is processed thereafter. According to the above-described embodiment, when such a die-cast product is manufactured, it is possible to set a manufacturing condition which makes a defect less likely to occur. As a result, a defective die-cast product is prevented from being supplied to the post-process, which leads to prevention of useless processing process of the die-cast product.

Further, while the product for which quality is to be managed in the above-described embodiment is a die-cast product, the product may be other manufactures such as an injection-molded article manufactured using an injection molding machine, and the above-described embodiment can be applied to manufactures other than the die-cast product.

In addition, part or all of the processors of the above-described respective apparatuses may be constituted as electronic circuits or may be constituted as circuit blocks in an integrated circuit such as an FPGA (field programmable gate array).

As described above, according to the above-described embodiment, it is possible to provide a manufacturing condition output apparatus which is capable of presenting how a manufacturing condition should be set for a defect probability to prevent occurrence of a defect of a product, a quality management system using the output, and a storage medium that stores a program having a function of causing the above-described manufacturing condition to be output.

The whole or part of the program to be executed at respective apparatuses described above is recorded or stored in a portable medium such as a flexible disk and a CD-ROM, or a storage medium such as a hard disk as a computer program product. All or part of operation is executed by the program being read by a computer. Alternatively, the whole or part of the program can be distributed or provided via a communication network. A user can easily implement the manufacturing condition output apparatus or the quality management system of the present embodiment by downloading the program via a communication network and installing the program in the computer or installing the program in the computer from a recording medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A manufacturing condition output apparatus which includes a processor and outputs a manufacturing condition of a product,
the processor being configured to:
output change degree information which is information regarding degrees of change of values regarding defect probabilities corresponding to respective values of a plurality of variables relating to manufacturing of the product from model information of a model generated through machine learning on a basis of manufacturing data of the product and inspection result data of the product, as the manufacturing condition;
display, based on the change degree information, the degree of the change for at least one variable of the plurality of variables on a display screen; and
set, for the at least one variable, the manufacturing condition that is values or ranges of variables where the product becomes a good-quality product or a defective product in accordance with the defect probabilities.

2. The manufacturing condition output apparatus according to claim 1,
wherein the model is a non-linear model.

3. The manufacturing condition output apparatus according to claim 2,
wherein the non-linear model is a model learned through ensemble learning such as random forest using a plurality of decision trees.

4. The manufacturing condition output apparatus according to claim 1,
wherein the processor outputs display data of the display screen for setting the manufacturing condition in association with a probability that the product becomes the good-quality product or the defective product.

5. The manufacturing condition output apparatus according to claim 1,
wherein the processor is configured to:
extract variable names of the plurality of variables as important items in accordance with degrees of importance calculated from the model information; and
output information of the extracted important items.

6. The manufacturing condition output apparatus according to claim 1,
wherein the product is a die-cast product manufactured by a die-casting machine.

7. A quality management system comprising a data acquisition apparatus, a model learning apparatus, and an estimation result output apparatus,
the data acquisition apparatus comprising:
a first processor configured to:
acquire manufacturing data from a manufacturing apparatus which manufactures a product; and
acquire inspection result data of the product manufactured by the manufacturing apparatus,
the model learning apparatus comprising:
a second processor;

a manufacturing data storage apparatus configured to store the manufacturing data acquired from the first processor; and an inspection result data storage apparatus configured to store the inspection result data acquired from the first processor, the second processor being configured to generate a model which estimates whether the product manufactured at the manufacturing apparatus is a good-quality product or a defective product through machine learning on a basis of the stored manufacturing data and the stored inspection result data, and the estimation result output apparatus comprising:

a third processor configured to:

estimate whether the product is the good-quality product or the defective product on a basis of the acquired manufacturing data using the model and output an estimation result;

output change degree information which is information regarding degrees of change of values regarding defect probabilities corresponding to respective values of plurality of variables relating to a manufacturing condition of the product from model information of the model, as the manufacturing condition;

display, based on the change degree information, the degree of change for at least one variable of the plurality of variables on a display screen; and set, for the at least one variable, the manufacturing condition that is values or ranges of variables where the product becomes a good-quality product or a defective product in accordance with the defect probabilities.

8. A non-transitory computer-readable storage medium that stores a program that is executed on a computer, the program causing the computer to execute:

processing of outputting change degree information which is information regarding degrees of change of values regarding defect probabilities corresponding to respective values of a plurality of variables relating to manufacturing of a product from model information of a model generated through machine learning on a basis of manufacturing data of the product and inspection result data of the product, as a manufacturing condition;

processing of displaying, based on the change degree information, the degree of changes for at least one variable of the plurality of variables on a display screen; and processing of setting, for the at least one variable, the manufacturing condition that is values or ranges of variable where the product becomes a good-quality product or a defective product in accordance with the defect probabilities.

* * * * *